UNITED STATES PATENT OFFICE 2,647,919

OXY-OXOESTERS AND ACIDS AND PROCESS FOR THEIR PREPARATION

Tracy M. Patrick, Jr., Dayton, Ohio, assignor to Monsanto Chemical Company, St. Louis, Mo., a corporation of Delaware No Drawing. Application June 23, 1950,
Serial No. 170,047

21 Claims. (Cl. 260—483)

This invention relates to a novel process for the preparation of oxy-oxoesters, oxy-oxocarboxylic acids and mixtures thereof and to the new compounds produced.

The novel process of this invention, in general, provides good yields of the oxyoxoesters and oxy-oxocarboxylic acids, enables relatively easy recovery of the unreacted oxyaldehyde and preferably employs economical raw materials which are readily commercially available.

It has been found that oxy-oxo compounds can be prepared in good yields by reacting an oxy substituted saturated aliphatic aldehyde with a compound from the group consisting of 4- to 6-carbon atom ethylenic unsaturated polycarboxylic acids, wherein the ethylenic bond is conjugated with at least one of the carbonyl groups, and esters thereof in the presence of a free radical promoting agent.

The oxy-oxo compounds of this invention can be diagrammatically represented by the structural formula

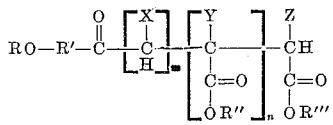

wherein X is selected from the group consisting of —H, —COOR$^{iv}$ and —CH$_2$COOR$^v$; $m$ is a small whole number from 0 to 1; Y and Z are selected from the group consisting of —H and —CH$_3$; $n$ is a small whole number from 0 to 1; the sum of $m$ plus $n$ is a small whole number from 1 to 2; R is a saturated hydrocarbon radical containing up to about 8 carbon atoms; R' is an alkylene radical containing up to about 8 carbon atoms; R$^{iv}$ is a saturated hydrocarbon radical containing up to about 20 carbon atoms; R'' is a saturated hydrocarbon radical containing up to about 20 carbon atoms and can also be —H when $m$ equals 1; and R''' and R$^v$ are selected from the group consisting of —H and saturated hydrocarbon radicals containing up to about 20 carbon atoms.

Suitable 4- to 6-carbon atom ethylenic unsaturated polycarboxylic acids are, for example, maleic acid, fumaric acid, citraconic acid, mesaconic acid, itaconic acid, aconitic acid, glutaconic acid and the like. The esters of the 4- to 6-carbon atom ethylenic unsaturated polycarboxylic acids can be mono-, di-, and tri-esters and can also be mixed esters; thus, partial esters, esters and mixed esters of the above acids can be selected from the group consisting of alkyl, aryl, aralkyl and cycloalkyl esters thereof, as for example, ethyl hydrogen maleate, 2-ethylhexyl hydrogen maleate, n-octadecyl hydrogen maleate, phenyl hydrogen maleate, benzyl hydrogen maleate, cyclohexyl hydrogen maleate, dehydroabietyl hydrogen maleate, tetrahydroabietyl hydrogen maleate, dimethyl maleate, diethyl maleate, dibutyl maleate, di-2-ethylhexyl maleate, diphenyl maleate, ditolyl maleate, dibenzyl maleate, diphenethyl maleate, dicyclohexyl maleate, ethyl benzyl maleate, phenyl cyclohexyl maleate, hexyl phenyl maleate and the like. Whereas the foregoing examples are limited to maleates, it will be readily understood that similar compounds of the other 4- to 6-carbon atom ethylenic unsaturated polycarboxylic acids can be employed. It is thus seen that by the term "saturated hydrocarbon radical" the conventional exception is made for normal benzene-ring unsaturation.

When the aldehyde reacts with an unsaturated polycarboxylic acid or partial ester such that the carbon atom with which the acyl group forms a new carbon-carbon bond also has a carboxyl radical attached thereto the compound so formed is in general unstable, evolving carbon dioxide from the carboxyl radical. When the carboxyl group is esterified, prior to the reaction with the aldehyde, decarboxylation does not occur. Thus in the process of this invention the substantially completely esterified acids are preferably employed.

The oxy substituted saturated aliphatic aldehydes are, for example, methoxy, ethoxy, propoxy, butoxy, hexoxy, phenoxy, toloxy, benzyloxy, phenethoxy, cyclopropoxy, cyclohexoxy and the like derivatives of ethanal, propanal, butanal, pentanal, hexanal, heptanal, octanal, nonanal, 2-ethylhexanal and the like and the alkoxy derivatives are generally preferred.

It will be seen that the above range of variables encompasses compounds having molecular weights from about 146 to 1288. In general, however, it is preferable that the R groups are not simultaneously at the maximum, thus compounds with a molecular weight of up to about 800 are preferred and substantially completely esterified compounds having a molecular weight of from about 218 to about 560 are more specifically preferred.

The free radical promoting agents are, for example, acetyl peroxide, benzoyl peroxide, lauroyl peroxide, hydrogen peroxide, peracetic acid, sodium perborate, ultraviolet radiation and the like. The free radical promoting catalyst is generally employed at from about 0.1 to about 5 mole per cent and preferably from about 0.25 to about 2 mole per cent based on the 4- to 6-carbon atom ethylenic unsaturated polycarboxylic acid and esters thereof; and the catalyst can be added all at once, in increments or continuously over a period of time.

It might be expected that any unsaturated polymerizable monomer could readily be reacted with an oxyaldehyde to produce an oxy-oxoester. This, however, is not the case since monomers which polymerize relatively easily to the polymer will tend to do so thus producing a high molecular weight resin with little or no reaction with the aldehyde to form a ketone. Thus, the reaction is in general limited to those unsaturated compounds which cannot be readily polymerized alone.

Polycarboxylic acid anhydrides, as for example, maleic anhydride and itaconic anhydride, are employed in many compositions to provide heteropolymers with the above type reactive monomers, as for example, styrene and vinyl acetate. Maleic acid and esters thereof can also form heteropolymers with the above reactive monomers, however they are less reactive than the anhydride which is generally preferred. It has now surprisingly been found that 4- to 6-carbon atom ethylenic unsaturated polycarboxylic acid anhydrides such as maleic and itaconic anhydride are not reactive with saturated aliphatic oxyaldehydes in the presence of a free radical promoting agent, whereas the free acid and esters thereof are reactive. Thus, reactions of this nature are not readily predictable.

*Example 1*

A 43-g. sample (0.25 mole) of redistilled diethyl maleate and 88 g. (1.0 mole) of redistilled β-methoxypropanal were mixed in a reaction vessel fitted with a reflux condenser, thermometer, and 100-watt ultraviolet lamp, which was sealed within the reaction vessel to prevent the filtration of the short wave-length radiation by the glass walls of the vessel. The vessel was placed in an ice-bath and the reaction initiated. The temperature of the reactants was allowed to slowly rise to about 70° C. over a period of about 2.5 hours, then the temperature was held at 70 to 75° C. by holding the vessel in a running water-bath. After about 18 hours the reaction was terminated and the reaction mixture fractionally distilled through a 10-inch Vigreux distilling column. The excess β-methoxypropanal and any unreacted diethyl maleate were removed and a 55 per cent yield of a pale yellow liquid having a boiling point of about 130 to 132° C. at 1 mm. pressure and a refractive index of 1.4414 at 25° C. was obtained.

This product was redistilled at 116° C./0.6 mm. to 115° C./0.5 mm. The distillate gave a violet ferric chloride test, had a refractive index of 1.4410 at 25° C. and a density $$\left(\tfrac{25}{25}\right)$$

of 1.0852. The product was identified as diethyl (β-methoxypropionyl) succinate.

Calculated for $C_{12}H_{20}O_6$: C, 55.37; H, 7.75. Found: C, 55.55; H, 7.68.

The residue (29.4 g.) of the original fractional distillation was a clear, dark-amber, viscous liquid telomeric product of β-methoxypropanal with diethyl maleate.

*Example 2*

A 34.4-g. sample (0.2 mole) of redistilled diethyl maleate, 52.8 g. (0.6 mole) of redistilled β-methoxypropanal and 0.2 g. of benzoyl peroxide were added to a 500-ml. jacketed flask which was fitted with a reflux condenser and a thermometer. Benzene was added to the jacket (which was also provided with a reflux condenser) and brought to a boil maintaining the reaction mixture at a temperature of about 80° C. After a reaction time of about 21 hours the amber liquid was allowed to cool.

The reaction mixture was then distilled through a 10-inch Vigreux fractionating column recovering the excess β-methoxypropanal and some unreacted diethyl maleate. The diethyl (β-methoxypropionyl) succinate was identified as in Example 1. The viscous, clear, reddish-brown telomeric residue was obtained in greater yield than Example 1.

Other compounds which can be prepared by the free radical induced reaction described herein are, for example:

Diethyl (β-ethoxypropionyl) succinate
Diethyl (β-butoxypropionyl) succinate
Di-2-ethylhexyl (β-methoxypropionyl) succinate
Tributyl α-(β-methoxypropionyl) tricarballylate In order to achieve good yields of the oxy-oxoester an excess of the oxyaldehyde is preferred. In general it is preferable to have from about 2 to about 5 moles of oxyaldehyde per mole of ester. The excess oxyaldehyde can be recovered by fractional distillation of the reaction mixture or by the preparation of the bisulfite addition product in neutral solution with subsequent extraction and regeneration of the oxyaldehyde. For the higher molecular weight products fractional molecular distillation is necessary to effect separation without decomposition where the relatively pure oxy-oxoester is desired. In general, however, the excess oxyaldehyde can be readily removed and a relatively small amount of an unreacted high molecular weight ester of an unsaturated polycarboxylic acid, which would be difficult or impossible to remove by normal distillation, is not detrimental for many applications. Thus oxy-oxoester products of high molecular weight can be a mixture consisting substantially of the desired product with small amounts of unreacted ester and telomers as impurities therein.

The oxy-oxoesters and oxy-oxocarboxylic acids of this invention can be employed as chemical intermediates, plasticizers and modifiers in coating, plastic and solvent formulations.

I claim:

1. A compound having the formula

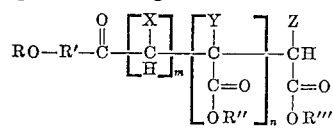

wherein X is selected from the group consisting of —H, —COOR$^{iv}$ and —CH$_2$COOR$^v$; $m$ is a small whole number from 0 to 1; Y and Z are selected from the group consisting of —H and —CH$_3$; $n$ is a small whole number from 0 to 1; the sum of $m$ plus $n$ is a small whole number from 1 to 2; R is a saturated hydrocarbon radical containing up to about 8 carbon atoms; R′ is an alkylene radical containing up to about 8 carbon atoms; R$^{iv}$ is a saturated hydrocarbon radical containing up to about 20 carbon atoms; R″ is selected from the group consisting of a saturated hydrocarbon radical containing up to about 20 carbon atoms and —H, when $m$ equals 1; and R‴ and R$^v$ are selected from the group consisting of —H and saturated hydrocarbon radicals containing up to about 20 carbon atoms.

2. The compounds of claim 1 having a molecular weight of from about 218 to about 560 wherein R is an alkyl radical and the carboxyl radicals are completely esterified.

3. The compounds of claim 1 having a molecular weight of from about 146 to about 800.

4. The compounds of claim 3 wherein the carboxyl radicals are completely esterified.

5. Dialkyl (oxyacyl) succinates of claim 1.

6. Trialkyl α - (oxyacyl) tricarballylates of claim 1.

7. The compound diethyl (β - methoxypropionyl) succinate.

8. The compound diethyl (β-ethoxypropionyl)-succinate.

9. The compound diethyl (β-butoxypropionyl)-succinate.

10. The compound di-2-ethylhexyl (β-methoxypropionyl) succinate.

11. The compound tributyl α-(β-methoxypropionyl) tricarballylate.

12. The process of preparing a compound having the formula

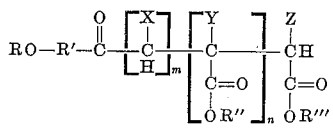

wherein X is selected from the group consisting of —H, —COOR$^{iv}$ and —CH$_2$COOR$^v$; $m$ is a small whole number from 0 to 1; Y and Z are selected from the group consisting of —H and —CH$_3$; $n$ is a small whole number from 0 to 1; the sum of $m$ plus $n$ is a small whole number from 1 to 2; R is a saturated hydrocarbon radical containing up to about 8 carbon atoms; R' is an alkylene radical containing up to about 8 carbon atoms; R$^{iv}$ is a saturated hydrocarbon radical containing up to about 20 carbon atoms, R'' is selected from the group consisting of a saturated hydrocarbon radical containing up to about 20 carbon atoms and —H, when $m$ equals 1; and R''' and R$^v$ are selected from the group consisting of —H and saturated hydrocarbon radicals containing up to about 20 carbon atoms; comprising the reaction of a molar excess of an oxy substituted saturated aliphatic aldehyde with a compound selected from the group consisting of 4- to 6-carbon atom ethylenic unsaturated polycarboxylic acids and esters thereof, wherein the ethylenic bond is conjugated with at least one of the carbonyl groups and the ester radical contains up to 20 carbon atoms, in the presence of a free radical promoting agent.

13. The process of claim 12 wherein the compounds have a molecular weight of from about 218 to about 560, R is an alkyl radical, and the carboxyl radicals are completely esterified; comprising the reaction of from about 2 to about 5 moles of an alkoxy substituted saturated aliphatic aldehyde with one mole of a completely esterified 4- to 6-carbon atom ethylenic unsaturated polycarboxylic acid in the presence of benzoyl peroxide.

14. The process of claim 12 wherein the compounds have a molecular weight of from about 146 to about 800 and from about 2 to about 5 moles of said aldehyde are employed per mole of said acid and esters thereof.

15. The process of claim 14 wherein the free radical promoting agent is ultraviolet radiation.

16. The process of claim 14 wherein the free radical promoting agent is benzoyl peroxide.

17. The process comprising the reaction of β-methoxy-propanal with diethyl maleate in the presence of a free radical promoting agent, wherein the molar ratio of oxyaldehyde to ester is from about 2 to about 5.

18. The process comprising the reaction of β-ethoxy-propanal with diethyl maleate in the presence of a free radical promoting agent, wherein the molar ratio of oxyaldehyde to ester is from about 2 to about 5.

19. The process comprising the reaction of β-butoxy-propanal with diethyl maleate in the presence of a free radical promoting agent, wherein the molar ratio of oxyaldehyde to ester is from about 2 to about 5.

20. The process comprising the reaction of β-methoxy-propanal with di-2-ethylhexyl maleate in the presence of a free radical promoting agent, wherein the molar ratio of oxyaldehyde to ester is from about 2 to about 5.

21. The process comprising the reaction of β-methoxy-propanal with tributyl aconitate in the presence of a free radical promoting agent, wherein the molar ratio of oxyaldehyde to ester is from about 2 to about 5.

TRACY M. PATRICK, JR.

References Cited in the file of this patent

UNITED STATES PATENTS

| Number | Name | Date |
|---|---|---|
| 2,332,896 | D'Alelio | Oct. 26, 1943 |
| 2,332,897 | D'Alelio | Oct. 26, 1943 |
| 2,332,900 | D'Alelio | Oct. 26, 1943 |
| 2,334,545 | D'Alelio | Nov. 11, 1943 |
| 2,373,548 | D'Alelio | Apr. 16, 1945 |